US005760571A

United States Patent [19]

Latham, II et al.

[11] Patent Number: 5,760,571

[45] Date of Patent: Jun. 2, 1998

[54] POWER SUPPLY DAMPING CIRCUIT AND METHOD

[75] Inventors: Paul W. Latham, II, Lee, N.H.; Lutz A. May, Newbury, United Kingdom

[73] Assignee: Signal Restoration Technologies I Limited Partnership, Houston, Tex.

[21] Appl. No.: 695,922

[22] Filed: Aug. 12, 1996

Related U.S. Application Data

[60] Provisional application No. 60/002,459, Aug. 16, 1995 and provisional application No. 60/014,340, Mar. 29, 1996.

[51] Int. Cl.$^6$ .............................. G05F 1/40; G05F 1/56; H02J 1/02

[52] U.S. Cl. .............................. 323/274; 323/280; 363/39

[58] Field of Search .............................. 363/39; 323/274, 323/275, 280, 281, 282

[56] References Cited

U.S. PATENT DOCUMENTS

| | | | |
|---|---|---|---|
| 4,929,883 | 5/1990 | Chieli | 323/282 |
| 5,030,919 | 7/1991 | Freuler et al. | 324/720 |
| 5,300,893 | 4/1994 | Freuler et al. | 330/84 |
| 5,365,161 | 11/1994 | Inoue et al. | 323/282 |
| 5,381,082 | 1/1995 | Schlicht | 323/281 |
| 5,392,000 | 2/1995 | Gillig | 330/107 |
| 5,402,084 | 3/1995 | Freuler et al. | 330/146 |
| 5,430,366 | 7/1995 | Erkert et al. | 323/282 |
| 5,589,762 | 12/1996 | Iannuzo | 323/282 |

OTHER PUBLICATIONS

Meyer, Robert G. and Mack, William D., A Wideband Low–Noise Variable–Gain BiCMOS Transimpedance Amplifier, IEEE Journal of Solid State Circuits, pp. 701–706, Jun. 1944.

*Primary Examiner*—Peter S. Wong
*Assistant Examiner*—Bao Q. Vu
*Attorney, Agent, or Firm*—Baker & Botts, L.L.P.

[57] ABSTRACT

A power supply damping circuit (22) coupled across the leads of a power supply (20) is able to substantially damp or reduce the resonant response of the power supply and any associated noise, ringing, or oscillation produced by the power supply. The power supply damping circuit (22) provides a low value real impedance in parallel with the power supply (20) as a means of damping the power supply resonance circuit. The power supply damping circuit (22) includes a transconductance element (36) capacitively coupled across a power supply (20). A bias control (54) provides a bias current to the transconductance element (36) to set the static current of the transconductance element (36).

23 Claims, 9 Drawing Sheets

POWER SUPPLY DAMPING CIRCUIT AND METHOD

CROSS REFERENCE TO PROVISIONAL APPLICATIONS

This application claims the benefit of U.S. provisional application Ser. No. 60/002,459, filed Aug. 16, 1995, and U.S. provisional application Ser. No. 60/014,340, filed Mar. 29, 1996.

TECHNICAL FIELD OF THE INVENTION

This invention relates in general to the field of electronic circuits and more particularly to a power supply damping circuit.

BACKGROUND OF THE INVENTION

The quality of power supply output in high speed analog and digital circuits is critical. A typical power supply does not exhibit a zero internal impedance characteristic over the bandwidth of the application circuit. If the internal impedance of the power supply is not low enough over the bandwidth of the application circuit, the power supply signal will be distorted, necessitating the use of bypass capacitors, printed circuit board power planes, or both. As a result, a conventional electronic circuit connected to a conventional power supply will consume varying amounts of current as the supply voltage is changed statically, due to finite resistive output impedance, and dynamically, due to bypass capacitors and inductive and capacitive components in the connecting wires.

In addition, a typical power supply often has short supply wires having a parasitic inductance in the range of 2–100 nH. Similarly, a power supply arrangement involving printed circuit board power planes may have a parasitic inductance of about 10 nH. The parasitic inductance of either the supply wires or the printed circuit board power planes appears in series with the application circuit. A typical power supply arrangement may also include power supply bypass capacitors shorting the power supply to ground to allow for the consumption of very large and abrupt impulses of current across the application circuit.

A significant problem associated with a typical power supply is the creation of an undesirable resonance circuit produced by the combination of the power supply's internal or parasitic inductance, internal resistance, and bypass capacitance. While the exaggerated response of the power supply at resonant frequencies is itself an undesirable property of power supplies, the output of a typical power supply may vary under the load of the application circuit, causing any noise present to be exaggerated and the output to become possibly distorted.

The resonance of a typical power supply circuit can be damped by inserting a low value real impedance in parallel with the power supply. However, a passive solution of merely inserting a small resistor in parallel with the power supply is unacceptable because of excessive power consumption in the resistor. Another possible solution for damping the resonance of a power supply resonance circuit is the use of series elements such as series lossy ferrite beads, which have been shown to be a relatively large and expensive option for damping of resonance circuits.

Therefore, a need has arisen for a means of removing or reducing the undesirable resonance response of a typical power supply.

SUMMARY OF THE INVENTION

In accordance with the present invention, a power supply damping circuit (PSDC) is provided that substantially eliminates or reduces disadvantages and problems associated with previous power supply circuits.

The present invention comprises a power supply damping circuit that approximates a low value real impedance placed in parallel with the power supply. The low value real impedance of the power supply damping circuit will damp or reduce the resonant response of the power supply and any associated noise, ringing, or oscillation produced by the power supply.

The power supply damping circuit of the present invention includes a transconductance element capacitively or AC-coupled to the power supply. The transconductance element is coupled to the power supply so that a positive, real, two terminal impedance is placed across the power supply. A DC bias current provided to the non-linear transconductance element through an amplifier provides a fixed bias point to set the static current consumption and power dissipation of the power supply damping circuit while providing an optimally high small signal transconductance to the transconductance element, and thereby allowing for the power supply to be modeled as a low value real impedance in series with the power supply.

Other embodiments of the present invention include a power supply damping circuit having alternate paths for low and high frequency signals so as to extend the operable bandwidth of the power supply damping circuit. The low frequency path is able to accommodate a relatively higher gain, as compared to the high frequency path. The high frequency path is able to accommodate a smaller gain, as compared to the low frequency path. Other embodiments of the invention include externally adjustable and adaptive designs for adjusting the transconductance of the power supply damping circuit. The power supply damping circuit may also be used in a testing environment to improve the testability of high speed analog, digital, or mixed analog and digital circuits.

BRIEF DESCRIPTION OF THE DRAWINGS

A more complete understanding of the present invention and the advantages associated therewith may be acquired by referring to the accompanying drawings in which like reference numbers indicate like features and wherein.

DETAILED DESCRIPTION OF THE INVENTION

Figure 1:
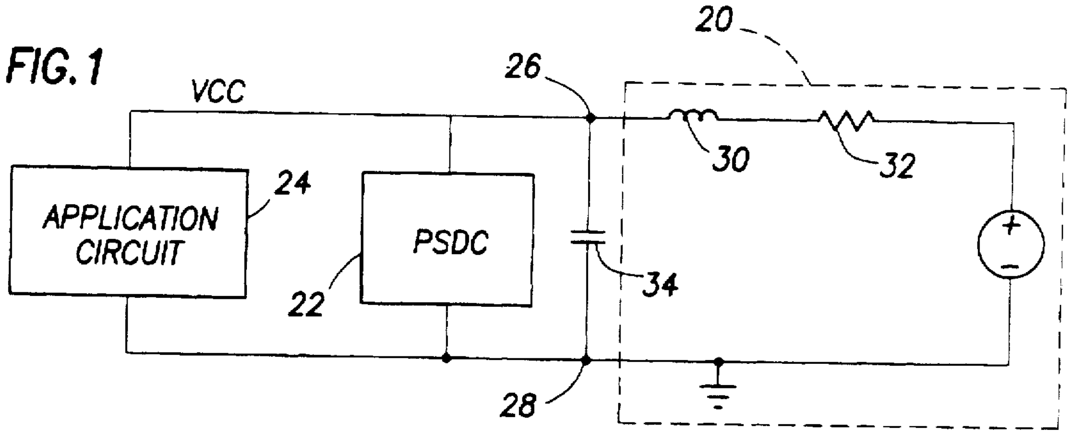
FIG. 1 is a block diagram of the power supply damping circuit of the present invention, a power supply, and an application circuit.

FIG. 1 is a block diagram of a power supply 20, power supply damping circuit 22, and application circuit 24. Like application circuit 24, power supply damping circuit 22 is connected between positive node 26 and negative node 28 of power supply 20. Power supply 20, like most lead wires, printed circuit board (PCB) traces, and IC packaging, has a parasitic inductance or package inductance 30 and a parasitic or internal resistance 32. Capacitor 34 may act as a bypass capacitor to short power supply 20 to ground to allow for the consumption of very large and abrupt impulses of current across application circuit 24. Capacitor 34 may also represent the parasitic inductance of typical IC packaging. Capacitor 34, along with parasitic inductance 30, forms a resonance circuit.

Figure 2:
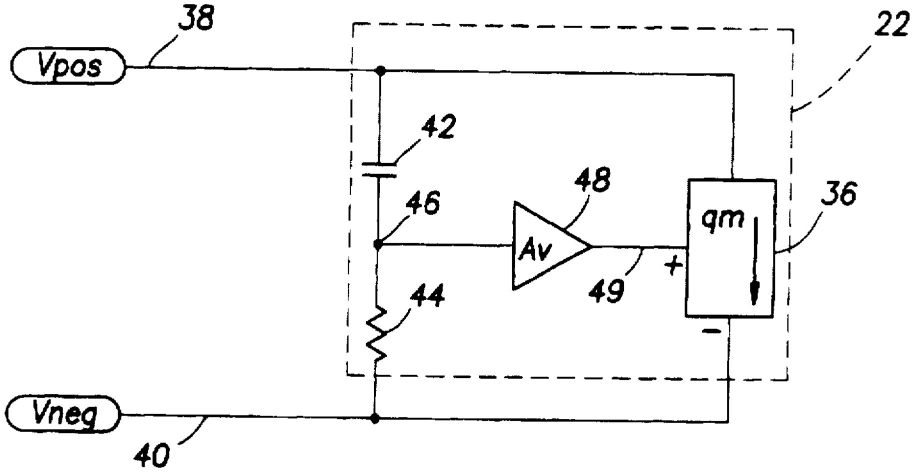
FIG. 2 is a block diagram of the power supply damping circuit of the present invention.

FIG. 2 is a block diagram of power supply damping circuit 22 of the present invention. As shown in FIG. 2, power supply damping circuit 22 includes a transconductance element 36 coupled between a positive terminal 38 and a negative terminal 40, which are coupled, respectively, to the positive node and the negative node of the power supply whose output is to be conditioned or dampened. Transconductance element 36 is AC-coupled to power supply 20 through capacitor 42 and resistor 44. Capacitor 42 is coupled between positive terminal 38 and a node 46, and resistor 44 is coupled between node 46 and negative terminal 40. Amplifier 48 is connected between transconductance element 36 and node 46. A bias point 49 is at the input of transconductance element 36.

The impedance of power supply damping circuit 22 as a function of frequency Z(s) is $$Z(s)=\frac{1}{A_v g_m}\ \frac{RCs+1}{RCs}$$

Where $A_v$ is the gain of amplifier 48, $g_m$ is the transconductance (I/V) of transconductance element 36, and C and R represent the capacitance of capacitor 42 and the resistance of resistor 44, respectively. At typical power supply frequencies, the impedance, Z, of the power supply is $$Z=\frac{1}{A_v g_m}\ .$$

Therefore, a design objective of power supply damping circuit 22 is to make the $A_v g_m$, product as large as possible over the frequencies that require power supply damping. The reciprocal of the $A_v g_m$ product yields a low value real impedance in parallel with the resonance circuit of the power supply. The low value real impedance of power supply damping circuit 22 raises the damping factor and reduces the Q, or quality factor, of the power supply resonance circuit, thereby reducing noise, oscillations, or ringing produced by power supply 20. Power supply damping circuit 22 provides a return path for AC power supply currents.

In operation, transconductance element 36 has a transconductance product, $A_v g_m$, on the order of 0.01 to 1.0 Amps/Volt, which will yield a low value real impedance of the power supply damping circuit 22 of between 1–100 ohms. Given the value of components typically present in power supply circuits, a low value real impedance on the order of 1–100 ohms is sufficient to reduce any resonance in the power supply 20 to tolerable levels over those frequencies requiring power supply damping.

Figure 3:
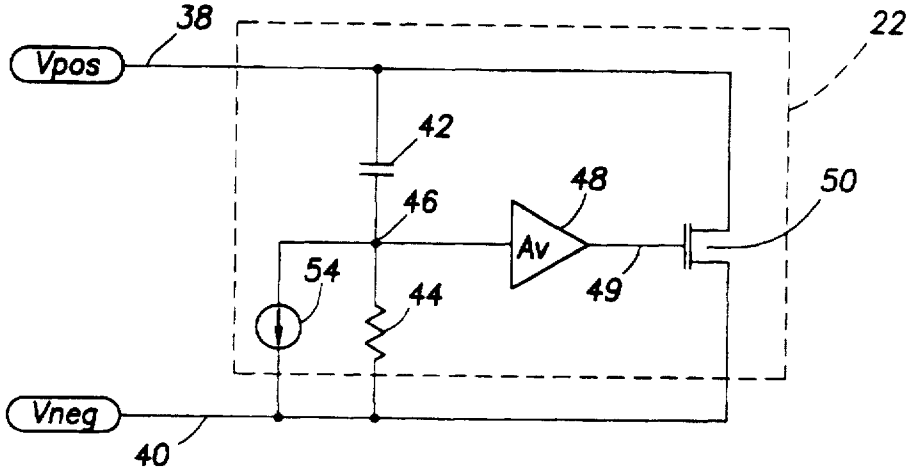
FIG. 3 is a block diagram of the power supply damping circuit of the present invention implemented with MOS technology.
Figure 4:
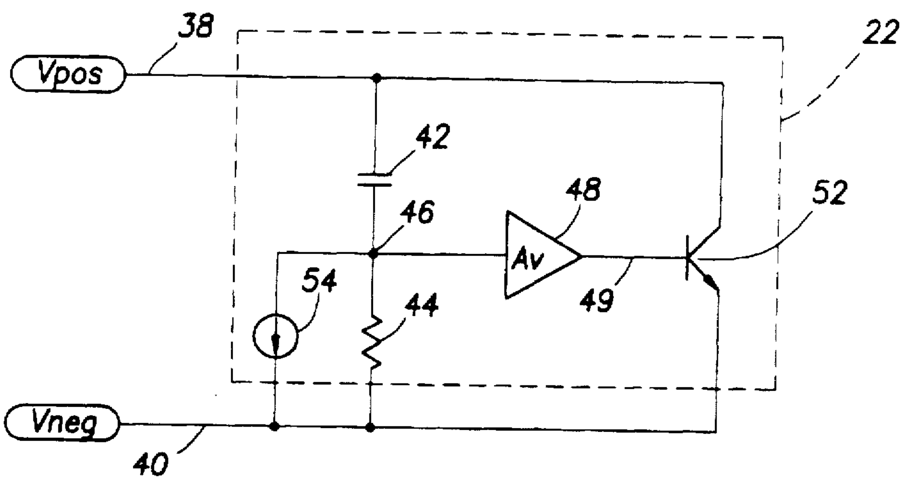
FIG. 4 is a block diagram of the power supply damping circuit of the present invention implemented with bipolar technology.

FIGS. 3 and 4 are diagrams of a power supply damping circuit 22 using either a MOS transistor 50 or a bipolar transistor 52, respectively, as transconductance element 36. A bias control element 54, connected between node 46 and negative terminal 40 of power supply 20, adjusts the bias point of the transconductance element, which in FIGS. 3 and 4 is either the gate of MOS transistor 50 or the base of bipolar transistor 52, depending on the implemented technology. Bias element 54 adjusts the input of amplifier 48, whose output biases the transconductance element. Amplifier 48 can be a unity gain amplifier. Biasing of the transconductance element adjusts both the transconductance of the transconductance element and the power dissipation of power supply damping circuit 22.

Because the transconductance of the transconductance element improves with increasing bias current, a large bias current is desirable. However, as the bias current of bias control 54 increases, so does the power dissipation of power supply damping circuit 22, thereby reducing the usefulness of power supply damping circuit 22 as a component of a larger system. Therefore, the requirement that power supply damping circuit 22 have a high transconductance value such that an optimally low value real impedance is provided in parallel with power supply 20 must be balanced against the danger of dissipating too much power in power supply damping circuit 22.

Figure 5:
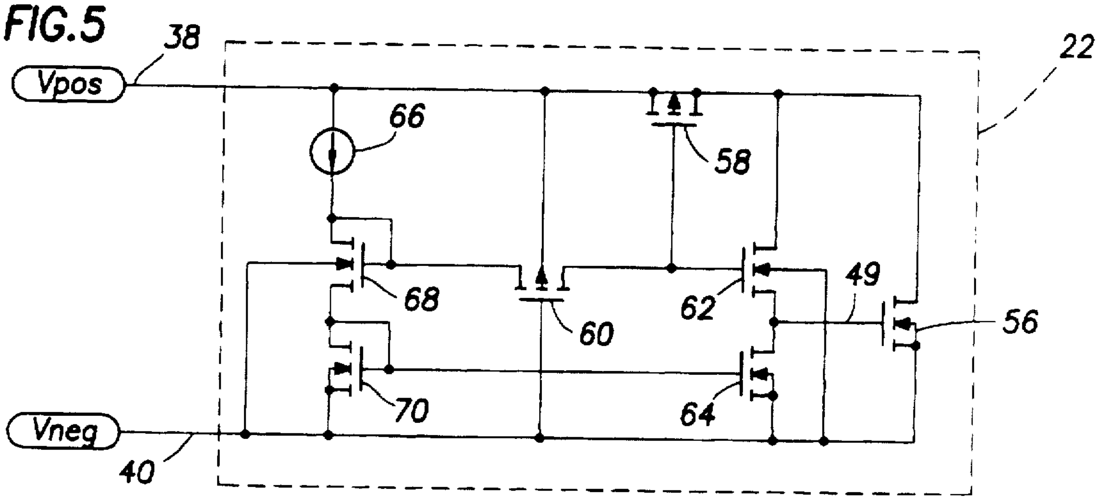
FIG. 5 is a schematic diagram of the power supply damping circuit of the present invention implemented with MOS technology.

A more detailed schematic representation of power supply damping circuit 22 of FIG. 3 is shown in FIG. 5. The transconductance element 36 of FIG. 3 (MOS transistor 50) is shown in FIG. 5 as CMOS transistor 56. The AC coupling of capacitor 42 and resistor 44 of FIG. 3 is represented in FIG. 5 by CMOS transistors 58 and 60, respectively. CMOS transistor 62 is a source follower analogous to amplifier 48 of FIG. 3. CMOS transistor 64 biases CMOS transistor 62 on. Constant current source 66, CMOS transistor 68, and CMOS transistor 70 provide the bias current to the gate of CMOS transistor 62.

Figure 6A:
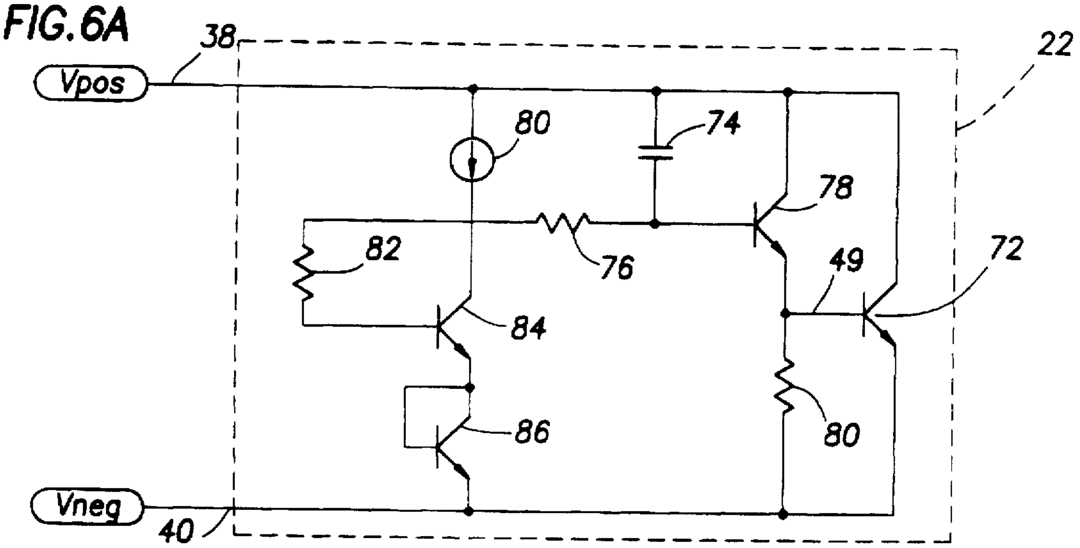
FIGS. 6A–6C are schematic diagrams of the power supply damping circuit of the present invention implemented with bipolar technology.

Similarly, a more detailed schematic representation of the power supply damping circuit of FIG. 4 is shown in FIG. 6A. The transconductance element of FIG. 4 (bipolar transistor 52) is shown in FIG. 6A as bipolar transistor 72, which is AC-coupled to positive terminal 38 and negative terminal 40 by capacitor 74 and resistor 76. Bipolar transistor 78 and resistor 80 of power supply damping circuit 22 are an emitter follower analogous to amplifier 48 of FIG. 4. Constant current source 80, resistor 82, and bipolar transistors 84 and 86 provide a bias current to the base of bipolar transistor 78.

In another application of FIGS. 3 and 4, amplifier 48 is removed from the circuit and a shorted connection is provided between node 46 and the transconductance element, which may comprise MOS transistor 50 or bipolar transistor 52. In this topology, the transconductance, $g_m$, of the transconductance element is determined solely by the bias current set by bias control element 54. A power supply damping circuit having a shorted connection between node 46 and the transconductance element provides the largest possible bandwidth and, thus, may be employed for high frequency applications. However, such an arrangement may not be advantageous for CMOS technology, for example, which generally provides lower transconductance values than does bipolar technology for the same applied current, thereby necessitating the use of an amplifier 48 having a gain of greater than one when the power supply damping circuit is implemented with CMOS technology.

CMOS transistors are prevalent in digital IC technology and have generally low transconductance values. For power supply damping circuits using CMOS technology, an amplifier having a gain of greater than 1 is inserted in the power supply damping circuit in an attempt to increase the $A_v g_m$ product, the reciprocal of which is the low value real impedance of power supply damping circuit 22. Such an amplifier is shown as amplifier 48 in FIG. 2. The use of an amplifier, however, introduces bandwidth limitations to power supply damping circuit 22.

Figure 6B:
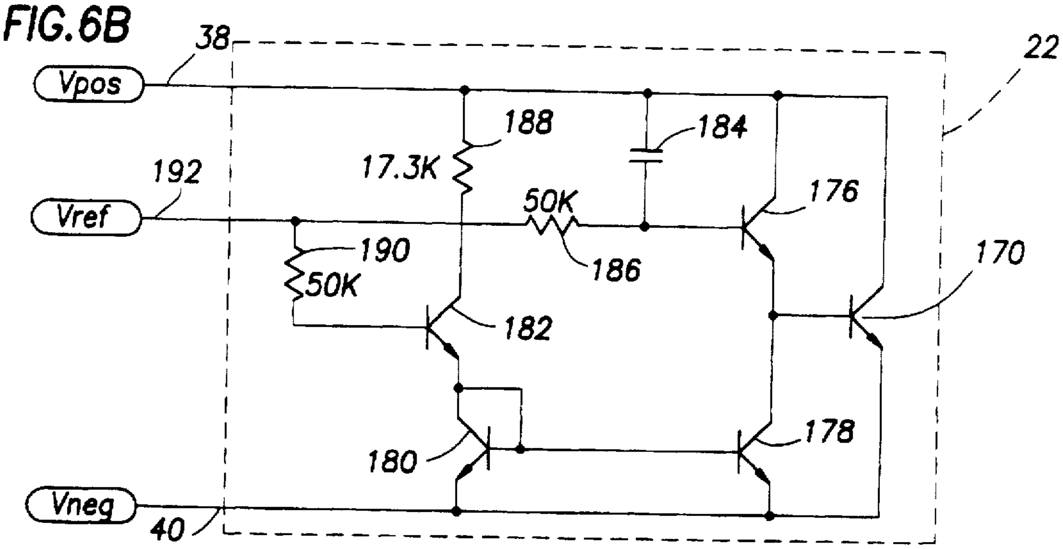

FIG. 6B shows an embodiment of a high bandwidth power supply damping circuit. This circuit functions as an AC-coupled shunt regulator that provides a low value real impedance from the positive terminal 38 to the negative terminal 40 for signals with a frequency greater than about 1 MHz. Capacitor 184 and bipolar transistors 170 and 176 provide for the shunt regulator. Bipolar transistors 178, 180 and 192, and resistors 186, 188, and 190 provide for DC bias. A reference voltage 192 is coupled into the DC bias element to increase the current in the element, therefore lowering the transconductance. The power supply damping circuit can be disabled by shorting the reference voltage 192 to the negative terminal 40. Also, the power supply damping circuit can be programmed to operate at higher current levels by connecting an external resistor between the reference voltage 192 and the positive terminal 38.

Figure 6C:
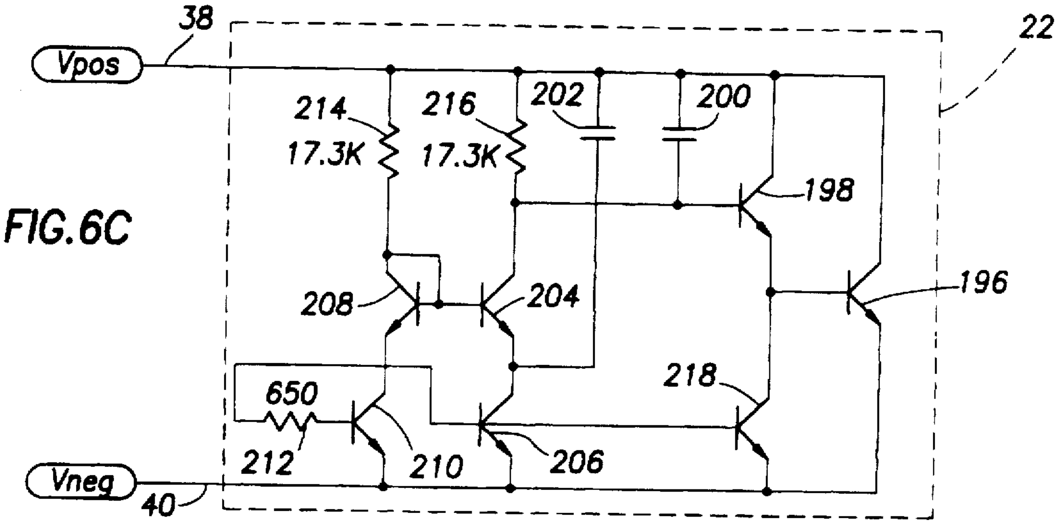

FIG. 6C shows an embodiment of a high gain power supply damping circuit. Like the high bandwidth power supply damping circuit of FIG. 6B, this circuit also functions as an AC-coupled shunt regulator that provides a low value real impedance from the positive terminal 38 to the negative terminal 40 for signals with a frequency greater than about 1 MHz. This embodiment of the present invention provides for two frequency-dependent shunt regulators. Capacitor 200 and transistors 196 and 198 provide for a high frequency shunt regulator, while capacitor 202 and transistors 196, 198 and 204 provide for a middle frequency, lower impedance shunt regulator. Transistors 204, 206, 208, 210, and 218, and resistors 212, 214, and 216 provide for DC bias. Transistors 218 and 206 bias on transistors 198 and 204, respectively, which increases the speed of the circuit.

Figure 7:
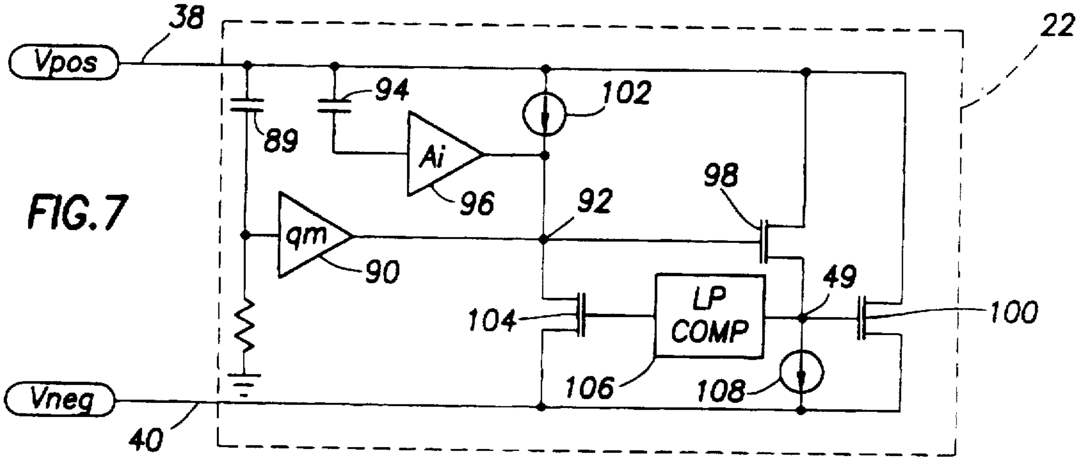
FIG. 7 is a block diagram of a parallel path power supply damping circuit of the present invention.

FIG. 7 is a block diagram of a circuit using CMOS technology and having alternate paths for high and low frequency signals in an attempt to alleviate amplifier bandwidth limitations. By providing a low frequency, high gain path and a high frequency, low gain path, the operable bandwidth of the power supply damping circuit is increased, while allowing for a modest voltage gain.

The low frequency parallel path of power supply damping circuit 22 of FIG. 7, having a high gain, is through capacitor 88 and transconductance amplifier 90. The output of transconductance amplifier 90 connects to high impedance node 92. The high frequency parallel path, having a lower gain than the low frequency parallel path, is through capacitor 94 and amplifier 96. Amplifier 96 may be any amplifier having a high bandwidth, including a single transistor common gate amplifier or a single transistor common base amplifier. Like the low frequency parallel path, the output of the high frequency parallel path connects to high impedance node 92. The high frequency parallel path increases the operable bandwidth of power supply damping circuit 22 by providing an alternate path for the highest frequency signals. The signal path for both low and high frequency signals continues through source follower or buffer amplifier 98 and transconductance element or transconductance transistor 100, which is analogous to transconductance element 36 of FIG. 2, MOS transistor 50 of FIG. 3, and bipolar transistor 52 of FIG. 4. As is well known in the art, source follower 98 is approximately a unity gain amplifier. The gate 49 of transconductance transistor 100, and thus, the bias point of transconductance transistor 100, is controlled by reference current 102, source follower 98, transistor 104, low pass filter 106, and bias current source 108.

Figure 8:
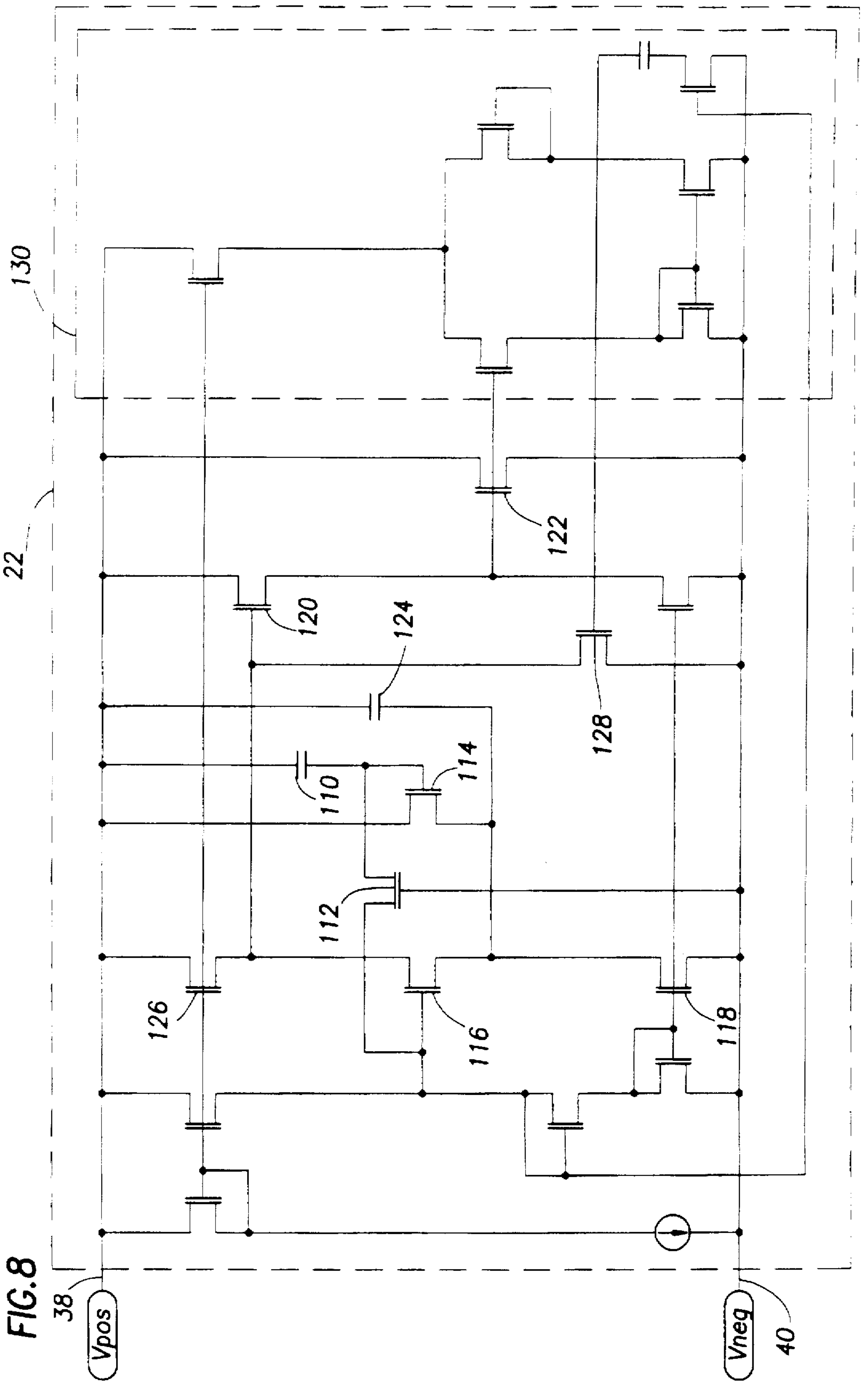
FIG. 8 is a schematic diagram of a parallel path power supply damping circuit of the present invention.

A more detailed schematic diagram of the parallel path power supply damping circuit of FIG. 7 is shown in FIG. 8. The low frequency signal path is through capacitor 110 and transistor 112, which acts as a resistor to provide AC coupling for power supply damping circuit 22. The signal from capacitor 110 is connected to the gates of a differential pair formed by transistors 114 and 116. Transistor 116 is biased on by transistor 118. The drain of transistor 116 is the noninverting output of the differential pair formed by transistors 114 and 116 and is connected to the gate of source follower 120. Transconductance amplifier 90 of FIG. 7 is shown on FIG. 8 as the difference of the voltage of the gates of transistor 114 and transistor 116, and the output of transconductance amplifier 90 is the current exiting from the drain of transistor 116.

The current from the drain of transistor 116 drives source follower 120, which is represented in FIG. 7 by source follower 98, which in turn drives transconductance transistor 122, which is represented in FIG. 7 by output transconductance transistor 100. As shown in FIG. 8, the drain and source of transconductance transistor 122 are connected between positive terminal 38 and negative terminal 40 of power supply damping circuit 22.

The high frequency path is through capacitor 124 and the source of transistor 116. As was the case for the low frequency path discussed previously, the signal in the high frequency path travels through the drain of transistor 116 to source follower 120 and transconductance transistor 122.

The components establishing the bias current for transconductance transistor 122 include a reference current that enters through transistor 126 and represents reference current 102 of FIG. 7, and transistor 128, which is transistor 104 of FIG. 7. The drain of transistor 128 is connected to the source of transistor 126 and the gate of source follower 120. The source of transistor 128 is connected to the negative terminal 40 of power supply damping circuit 22. Low pass filter 106 and the feedback loop consisting of low pass filter 106 and bias current source 108 of FIG. 7 are shown schematically in FIG. 8 in the form of the capacitors and transistors in block 130.

The semiconductor devices used to implement transconductance element 36 in FIG. 2, such as the MOS and bipolar devices shown in FIGS. 3 and 4, have nonlinear transfer characteristics. Because of the operation of semiconductor devices as current sinks from the positive supply and current sources through the negative supply, semiconductor transconductors, such as the transconductance elements in FIGS. 2, 3, and 4, are unidirectional and operate in the first quadrant of the V versus I curve (output current as a function of applied voltage). When a semiconductor transconductor is conducting it is in Class A operation. However, when the applied signal exceeds the lower limit of the bias level, the semiconductor transconductor is cutoff and the device is in Class AB operation. The range of the cutoff region of operation depends on the operating characteristics of the semiconductor device, the bias level of the device, and the signal size. When the power supply damping circuit is cutoff, the effectiveness of the power supply damping circuit is reduced as the circuit is not providing a low value real impedance suitable for damping the resonance of the power supply.

The transfer function of a semiconductor transconductor in the time domain is expressed as $$i(t)=g_m(V_{bias}+v(t))$$

Where $g_m$ is the transconductance function, $V_{bias}$ is the voltage at the bias point 49 of the transconductance element in FIGS. 2, 3, and 4, for example, and I(t) and v(t) are the current and voltage, respectively, of the transconductance element as a function of time. Bias point 49 of a transconductance element may be the base of a bipolar transistor transconductance element or the gate of a MOS transistor transconductance element. So long as $V_{bias}$+v(t) is greater than or equal to zero, the power supply damping circuit is damping and not in the cutoff region of operation. One method of insuring that the semiconductor transistor is never in cutoff is to increase $V_{bias}$ to an arbitrarily high level. However, an increase in $V_{bias}$ results in much greater and undesirable power dissipation.

To solve the problem of setting the appropriate bias point for the power supply damping circuit, either a fixed transconductance or an adaptive transconductance design can be employed. A fixed transconductance design has a preset bias level according to circuit design specifications. A fixed transconductance can be adjusted or trimmed to a desired bias level after manufacture. Having a fixed bias level, and thus having a fixed transconductance and a fixed low value real impedance for the power supply damping circuit, has the advantage of being a low cost application. A fixed bias level design, however, requires prior knowledge of application requirements.

Figure 9:
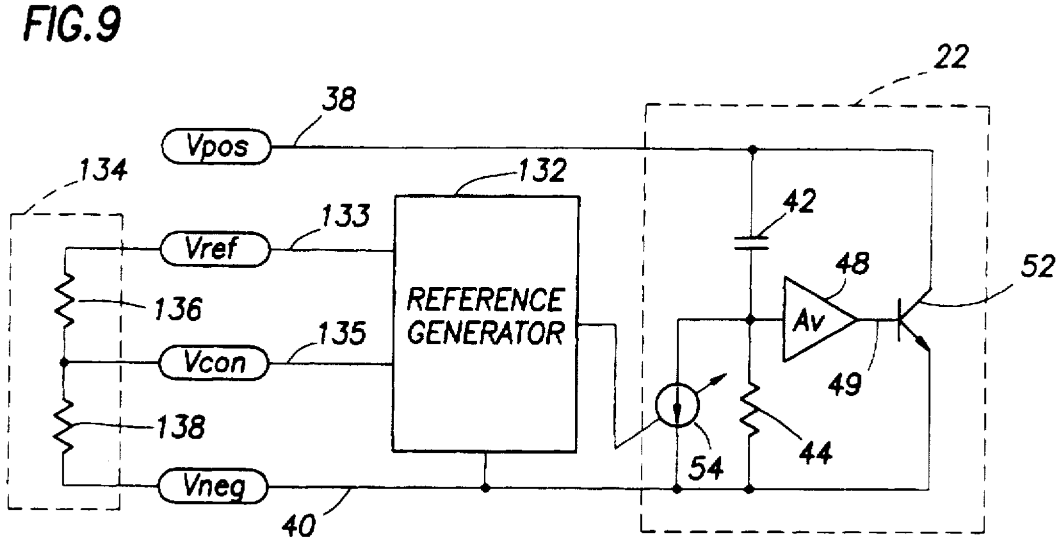
FIG. 9 is a block diagram of the power supply damping circuit of the present invention having an externally adjustable fixed transconductance design.

FIG. 9 is an example of a fixed transconductance design having an externally adjustable bias level. FIG. 9 is similar to FIG. 4 with the addition of a reference generator 132 external to power supply damping circuit 22. Reference generator 132 provides a reference voltage through a reference voltage terminal 133 to an external resistor divider 134, which includes resistors 136 and 138. Reference generator 132 measures the divided voltage between resistors 136 and 138 through a voltage measurement terminal 135, and uses the sampled voltage as a means for adjusting bias control 54 and the bias point of transconductor or bipolar transistor 52.

Figure 10:
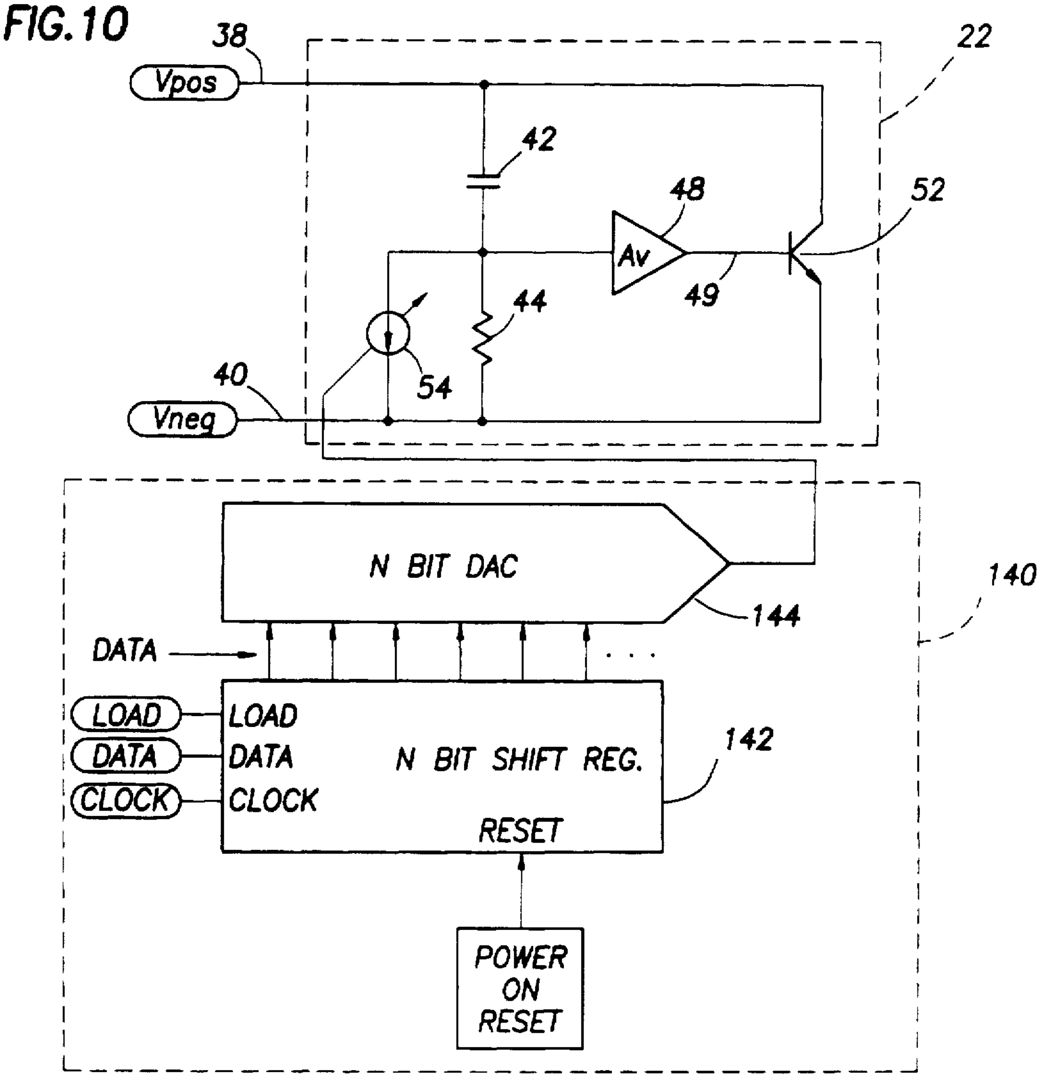
FIG. 10 is a schematic diagram of the power supply damping circuit of the present invention having a digital, adjustable fixed transconductance design.

FIG. 10 is another example of a fixed transconductance design having an externally adjustable bias level. Using a digital controller 140, the bias level of the power supply damping circuit is externally controlled. Digital controller 140 includes a digital shift register 142. The count of digital shift register 142 is converted to an analog value by D/A converter 144. As shift register 142 increases, the bias current in bias control 54 increases.

Figure 11:
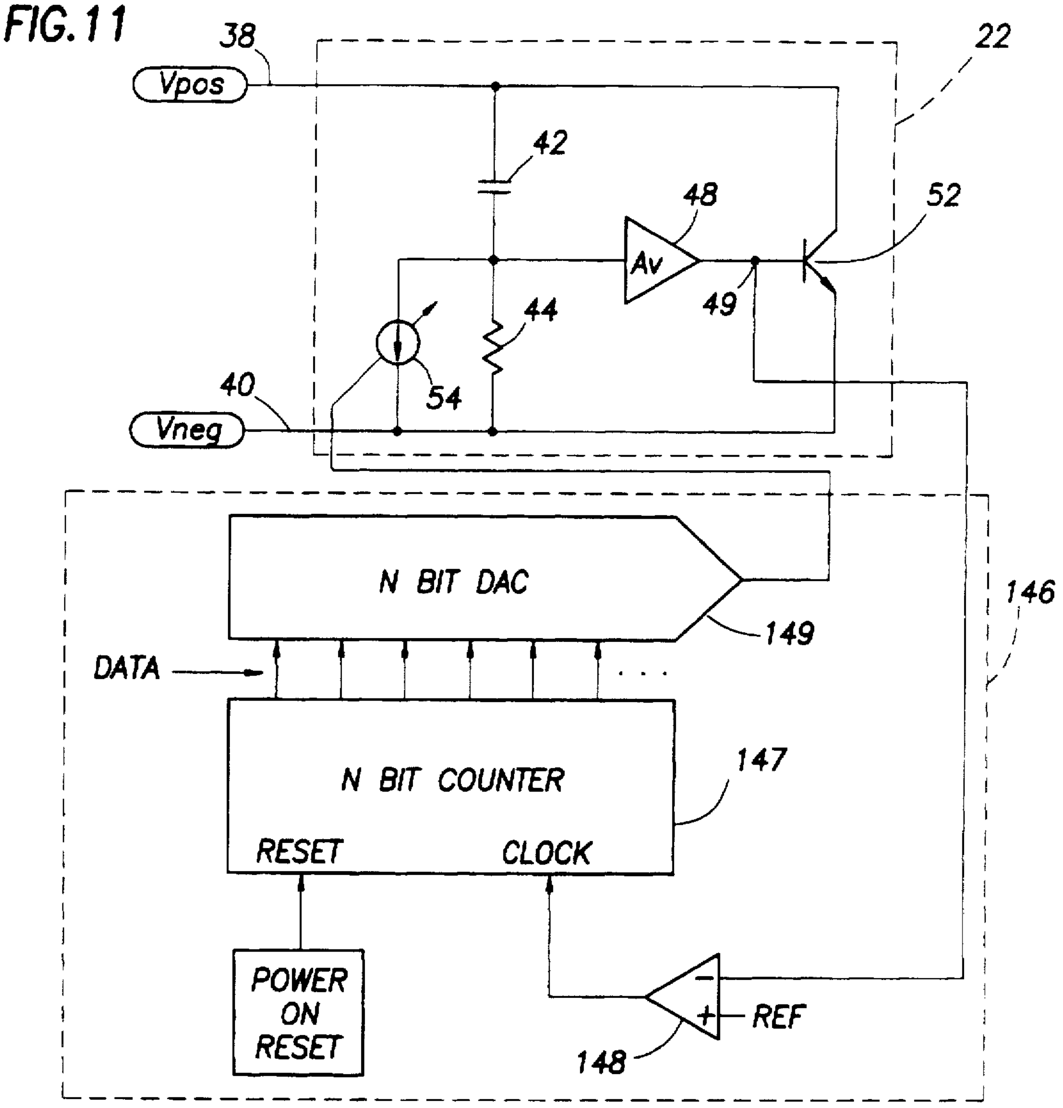
FIG. 11 is a block diagram of the power supply damping circuit of the present invention having an adaptive peak detector transconductance design.

Adaptive transconductance designs involve adjusting the bias point of the transconductance element in response to the applied noise to the power supply damping circuit. Two such methods are the peak detector method, shown in FIG. 11, and the proportional gain method, shown in FIG. 12. The peak detector method increases the bias level of the circuit until the transconductance element operates in only Class A operation. At power up, the power supply damping circuit is initialized to have a $g_m$=0. A peak detection unit 146 monitors the bias point 49 of bipolar transistor 52 to determine when the device is cutoff. Peak detection unit 146 includes a comparator 148 to compare the bias voltage to a reference voltage. The output of the comparator is provided to a counter 147, the output of which is provided to a D/A converter 149 that provides an analog signal to the bias control element 54 of the power supply damping circuit 22. When bipolar transistor 52 is in cutoff, the bias level is increased. Using this option, the first noise spikes will be let through, after which the bias level will be increased until all the noise spikes are attenuated.

Figure 12:
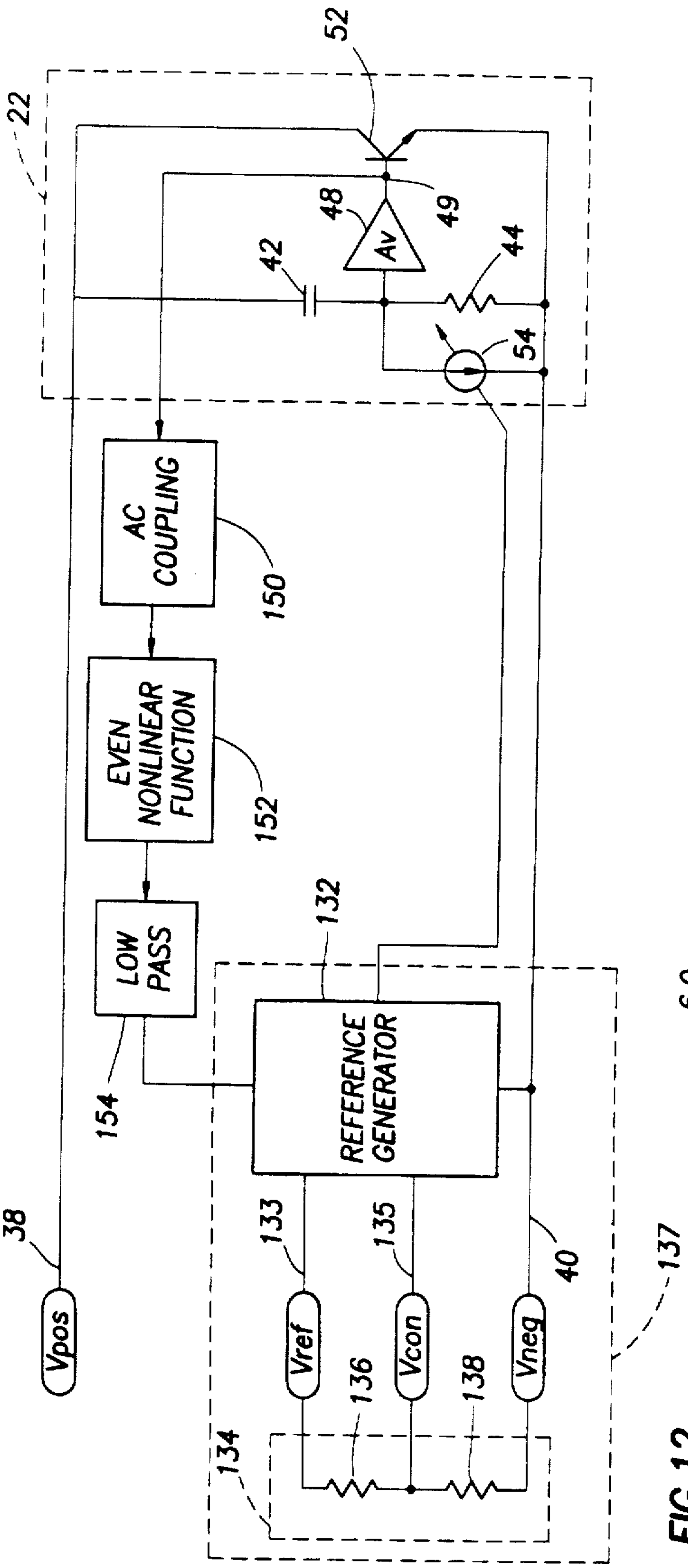
FIG. 12 is a schematic diagram of the power supply damping circuit of the present invention having an adaptive rectifying transconductance design.

The proportional gain method, as shown in FIG. 12, measures the power supply noise signal by rectifying the AC coupled noise and controlling the bias point according to the low pass filtered rectified noise level. After the sampled signal from the bias point 49 of transconductor or bipolar transistor 52 passes through the AC coupling element 150, the signal then passes through a rectifier 152. The rectifying function of rectifier 152 can be accomplished by any nonlinear function, including absolute value, squaring, or root mean square functions. The signal is then passed through low pass filter 154 before entering bias control system 137.

Bias control system 137 may include, for example, the reference generator and resistor divider combination shown in FIG. 9. In this configuration, reference generator 132 may apply a proportionality constant to the received signal by applying a reference voltage to resistor divider 134, measuring the divided voltage, and adjusting bias control 54 accordingly. The bias control system 137 is preferably externally adjustable.

AC coupling element 150, rectifier, 152, low pass filter, 154, and bias control system 137 form a bias control loop. Bias control system 137 is not limited to components as shown in FIG. 12, but may also include digital or other biasing components. In addition, the bias control system need not bias of power supply damping circuit 22 solely on the basis of a proportionality constant but may also adjust the bias on the basis of an acceptable noise level or gain, for example, in the bias control loop. The fixed and adaptive transconductance designs of FIGS. 9–12 are not limited to bipolar technology, but can be implemented with any suitable transconductor technology.

Both the fixed transconductance design and the adaptive transconductance design for setting the bias point of the power supply damping circuit can serve the function of switching the power supply damping circuit on or off by switching the bias current of the transconductance element on or off, respectively.

Figure 13A:
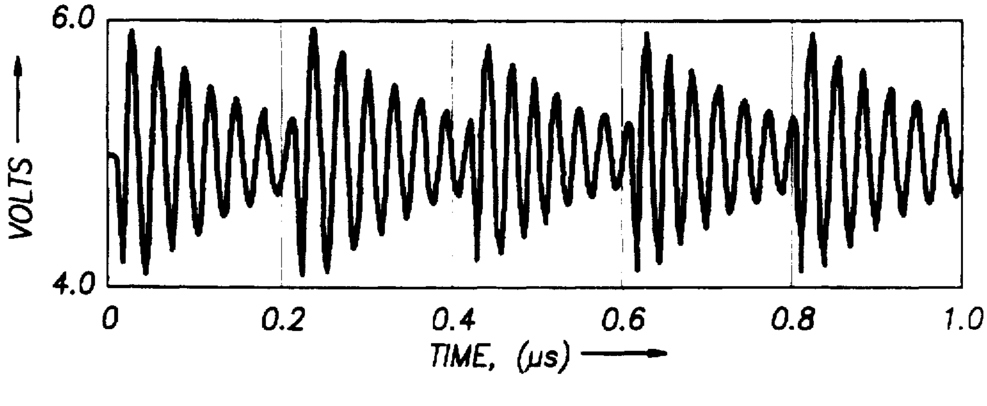
FIG. 13*a* and 13*b* are graphical representations of a power supply voltage both with and without the application of the power supply damping circuit of the present invention.
Figure 13B:
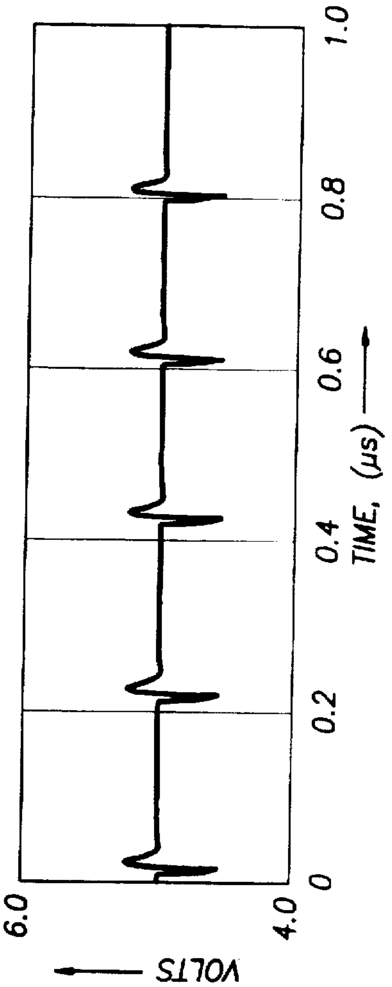
Figure 14:
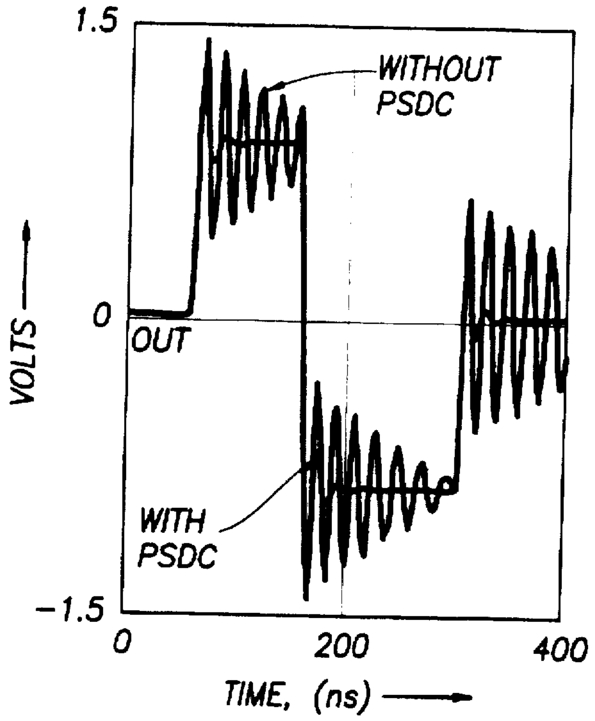
FIG. 14 is a graphical representation of a power supply step function both with and without the application of the power supply damping circuit of the present invention.
Figure 15:
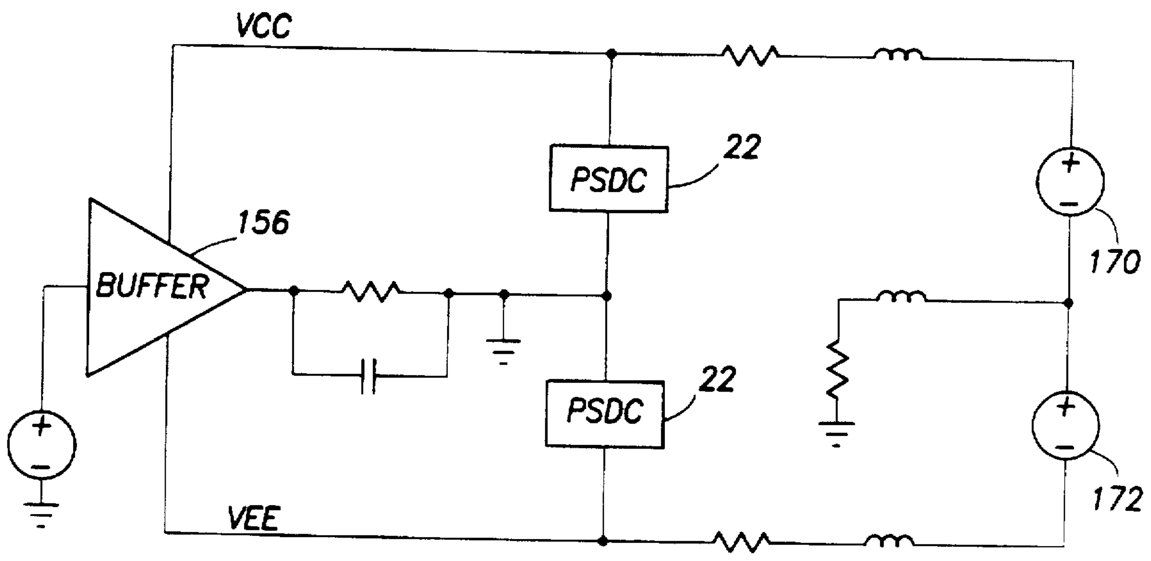
FIG. 15 is a block diagram of a dual supply application of the power supply damping circuit of the present invention.

As discussed earlier, the single power supply application of power supply damping circuit 22 is shown in FIG. 1. FIG. 13*a* and 13*b* are graphical representations of the applied power supply voltage to application circuit 24 as a function of time both with and without resonance damping applied by power supply damping circuit 22. FIG. 14 is a graphical representation of a ringing power supply step function as a function of time both with and without resonance damping applied by power supply damping circuit 22. The step functions of FIG. 14 are superimposed, with the step function with an applied power supply damping circuit having a pronounced ringing characteristic. FIG. 15 is a block diagram of a dual supply application of power supply damping circuit 22. This application may be implemented for buffers, op amps, or other dual supply applications. As shown in FIG. 15, buffer 156 has two power supplies 170 and 172, both of which have a separate power supply damping circuit coupled between their terminals and ground.

Figure 16:
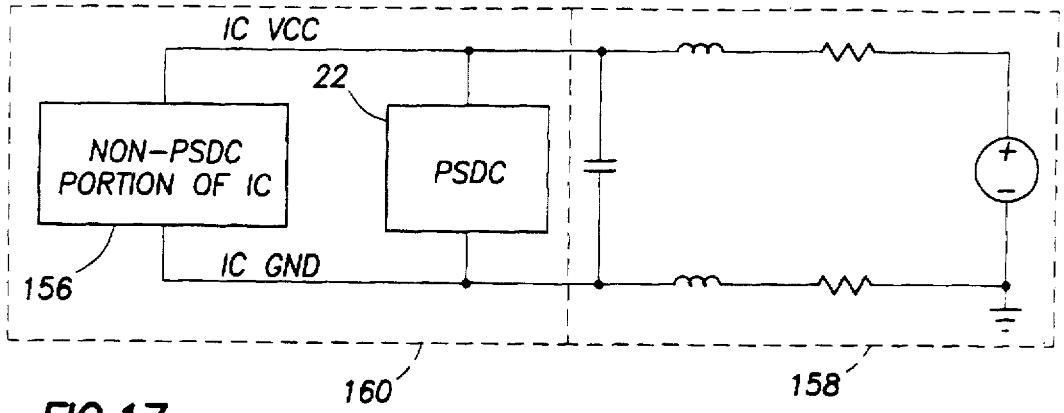
FIG. 16 is a block diagram of the application of a power supply damping circuit of the present invention in a testing environment.

A significant application for the power supply damping circuit is the use of the circuit as an aid in the testing of high speed digital, analog, or mixed digital and analog circuits. As shown in FIG. 16, a power supply damping circuit is provided integrally in the same IC die 160 as application circuit 156 and is coupled across application circuit 156 and testing circuit 158. Application circuit 156 is the circuit to be tested by testing circuit 158. When an IC is tested by a probe or during a final (packaged) test, the IC being tested is often connected to the testing circuit by long interconnections having significant self or mutual inductance or both. In addition, because of mechanical constraints in IC die probe systems and IC package handlers, power supply bypass capacitors cannot be mounted sufficiently close to the IC being tested to mitigate the high frequency effects of interconnection inductance, which often causes measurement errors, distortion, noise and stability problems. However, by connecting the power supply damping circuit of the present invention across the power supply terminals of the testing circuit 158 on the same die 160 as the IC application circuit 156, inductance problems are significantly reduced, thereby improving the accuracy and reliability of high frequency tests. Power supply damping circuit 22 of the present invention can also be used to improve the testability of low power systems, such as battery powered systems. Because the supply current to power supply damping circuit is often not critical in a testing environment, the bias current can be increased to improve testability.

Figure 17:
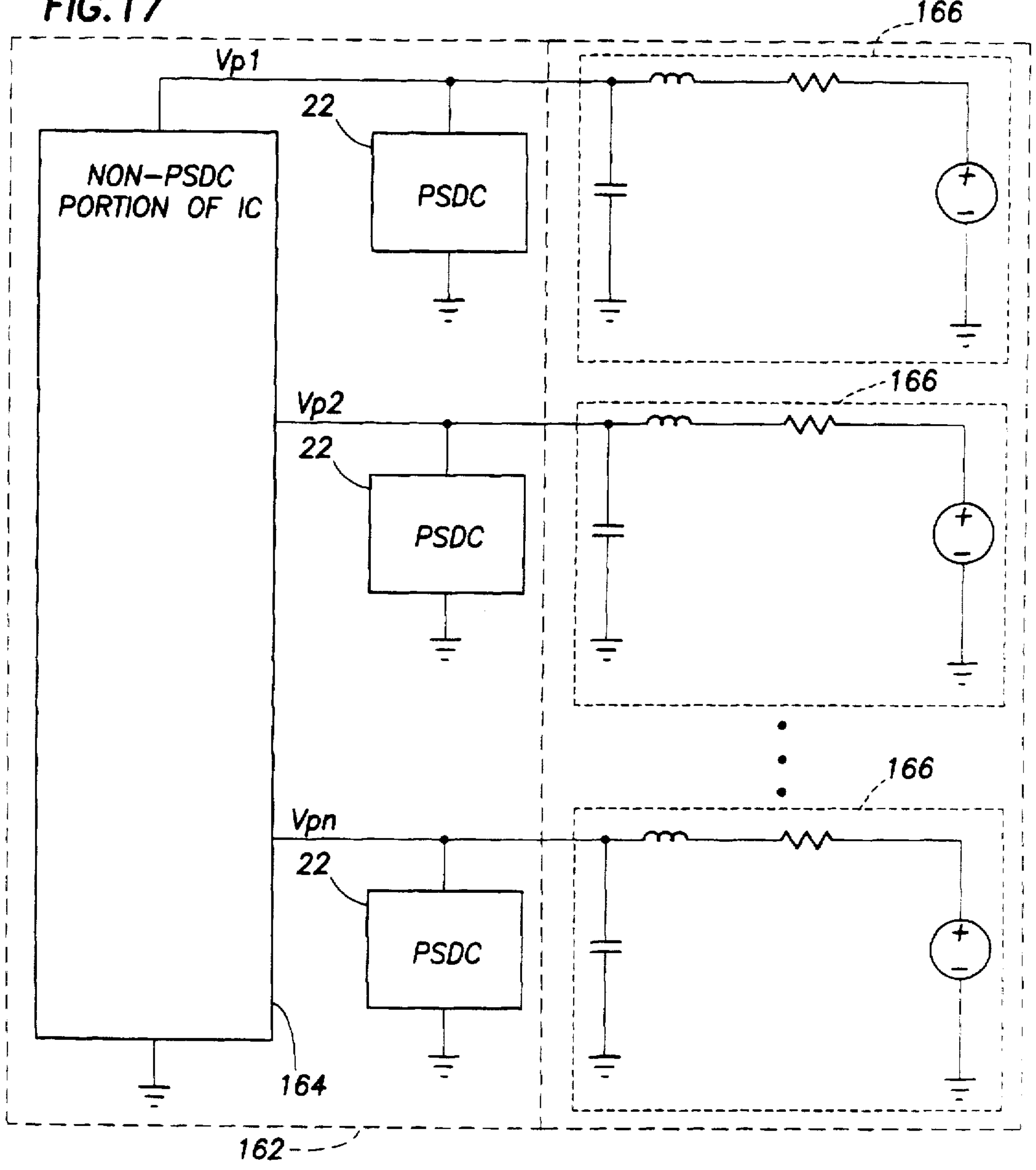
FIG. 17 is a block diagram of the application of a power supply damping circuit of the present invention in a multi-supply testing environment.

A multi-supply testing environment is shown in FIG. 17. Each of the power supply damping circuits 22 is provided integrally in IC die 162 with the application circuit 164 being tested. Each power supply damping circuit is connected across the application circuit 164 and a testing circuit 166. The power supply damping circuit used in the testing environment can be disabled for normal operation of the application circuit to minimize power dissipation.

The use of the power supply damping circuits for testing can reduce power supply noise and clock jitter in high speed digital circuits, limit crosstalk in mixed analog/digital circuits, and make high speed analog measurements more accurate, or, in some cases, possible. The applications for the power supply damping circuit of the present invention in testing circuits includes the testing of ICs, RISC microprocessors, digital signal processor chips, LAN chips, WAN chips, A/D converters, D/A converters, switched capacitor circuits, switched current circuits, phased locked loop circuits, television circuits, radio circuits, high speed analog circuits, and disc and tape drive circuits, for example.

Power supply damping circuit 22 can be implemented from any type of semiconductor transconductor, including bipolar, JFET, MOS, and Power MOS technologies. To be most effective, high transconductance values are needed, making bipolar and high power MOS devices the best choice. Because adaptive peak detectors, as discussed above with respect to FIG. 11, and AC coupling require either high internal impedance or the use of external capacitors, a fully integrated solution using adaptive peak detectors or AC coupling may be best achieved using BiCMOS technology.

One of the advantages of the power supply damping circuit of the present invention is the small size of the circuit. The power supply damping circuit can be implemented in the form of a very small integrated circuit (<5000 $mils^2$) and can be packaged in small IC packages. Because the power supply damping circuit is compatible with almost any integrated circuit process, the power supply damping circuit can be added at very low cost to most ICs. The power supply damping circuit can also be employed in mixed analog and digital ICs, which often have noise coupling problems through their supply leads.

Unlike large capacitors, the power supply damping circuit of the present invention has very little energy storage. The lack of significant energy storage is desirable for removable power supply applications and for providing intrinsically safe electronics for industrial applications.

There are two primary application techniques for the power supply damping circuit. The circuit can be integrated with other applications as part of an IC, or can be packaged as a stand alone product. When the power supply damping circuit is integrated with the application circuit as part of an IC, the power supply is able to mitigate the effects of PCB and IC package inductance. Fabricating the power supply damping circuit with the application circuit also insures that the application circuit and the power supply damping circuit have comparable bandwidth. An integrated solution may also have lower costs.

A sampling of integrated IC products that could be improved with the use of the power supply damping circuit include standard analog applications, including buffers and operational amplifiers, which would be aided by greatly reduced sensitivity to PCB layout and bypass capacitor requirements. Mixed analog and digital applications and ASIC products would benefit from system noise reduction. IC applications may also benefit from a reduction in electromagnetic interference and clock jitters, and improvements in noise margin.

When used as a stand alone product, the power supply damping circuit can be implemented in a low cost IC package having as few as two terminals. Key applications for the stand alone package include power supply conditioning for systems using wall outlet power supply modules. Such systems include telephone equipment, video equipment, and video games. The power supply damping circuit of the present invention can also be used as an add-on product for multiple PCB systems using a single power supply. Such systems include internal computer peripherals, large-scale testing and measurement systems, telephone PBX systems, and military electronics.

Although the present invention has been described in detail, it should be understood that various changes, substitutions, and alterations can be made without departing from the spirit and scope of the invention as defined by the appended claims.

What is claimed is:

1. A power supply damping circuit for providing a low value real impedance in parallel with a power supply, comprising:
   - first and second leads;
   - a transconductance element having a bias point and coupled between the first and second leads;
   - an AC-coupling member coupled between the first and second leads and the transconductance member;
   - an amplifier coupled between the AC-coupling member and the bias point of the transconductance element; and a bias element coupled between the amplifier and the second lead for biasing the amplifier and thereby biasing the transconductance element.

2. The power supply damping circuit of claim 1, wherein the transconductance element has a transconductance product of between about 0.01 amps/volt and about 1.0 volts/amp.

3. The power supply damping circuit of claim 1, wherein the transconductance element comprises a bipolar transistor.

4. The power supply damping circuit of claim 1, wherein the transconductance element comprises a MOS device.

5. The power supply damping circuit of claim 1, further comprising an externally adjustable bias controller coupled to the bias element.

6. The power supply damping circuit of claim 1, further comprising a digital controller coupled to the bias element for adjusting the bias of the bias element.

7. The power supply damping circuit of claim 1, further comprising an adaptive bias controller coupled to the bias element.

8. A power supply damping circuit for providing a low value real impedance in parallel with a power supply, comprising:

positive and negative terminals;

a transconductance element having a bias point and coupled between the positive and negative terminals;

a buffer amplifier having an input, a first output lead coupled to the positive terminal, and a second output lead coupled to the bias point of the transconductance element;

a first parallel path coupled between the positive terminal and the input of the buffer amplifier for low frequency signals;

a second parallel path coupled between the positive terminal and the input of the buffer amplifier for high frequency signals;

an AC-coupling member coupled between the first and second leads and the transconductance member; and biasing means for biasing the bias point of the transconductance element.

9. The power supply damping circuit of claim 8, wherein the transconductance element comprises a CMOS device.

10. The power supply damping circuit of claim 8, wherein the first parallel path comprises a capacitor coupled to the negative terminal, and a transconductance amplifier coupled to the capacitor and the buffer amplifier.

11. The power supply damping circuit of claim 8, wherein the second parallel path comprises a capacitor coupled to the negative terminal, and a high frequency amplifier coupled to the capacitor and the buffer amplifier.

12. The power supply damping circuit of claim 9, wherein the high frequency amplifier comprises a single transistor common gate amplifier.

13. The power supply damping circuit of claim 9, wherein the high frequency amplifier comprises a single transistor common base amplifier.

14. A method for damping the resonance of a power supply, comprising the steps of:

applying a capacitively-coupled transconductance element having an input in parallel with the power supply;

applying a bias current through an amplifier to the input on the transconductance element;

adjusting the bias current so that the resonance of the power supply is effectively damped by the application of a low value real impedance in parallel with the power supply.

15. The method for damping the resonance of a power supply of claim 14, wherein the low value real impedance is between about 1 ohms and about 100 ohms.

16. The method for damping the resonance of a power supply of claim 14, wherein the step of adjusting the bias current further comprises the step of adaptively adjusting the bias current according to a sampled input of the transconductance element.

17. A method for improving the testability of a high speed circuit in an integrated circuit, comprising the steps of:

providing a circuit to be tested;

providing a power supply damping circuit integral with the high speed circuit being tested, the power supply damping circuit having a transconductance element;

providing a testing circuit;

coupling the power supply damping circuit across the circuit to be tested and the testing circuit; and biasing the transconductance element of the power supply damping circuit such that a real impedance value is applied in parallel with the circuit to be tested.

18. A circuit, comprising:

a transconductance element;

an AC-coupling element coupled to the transconductance element for providing a power supply signal to the transconductance element; and a biasing element coupled to the transconductance element for biasing the transconductance element.

19. A power supply damping circuit for providing a low value real impedance in parallel with a power supply, comprising:

first and second leads;

a transconductance element having a bias point and coupled between the first and second leads;

an AC-coupling member coupled between the first and second leads and the transconductance member;

an amplifier coupled between the AC-coupling member and the bias point of the transconductance element;

a bias element coupled between the amplifier and the second lead for biasing the amplifier and thereby biasing the transconductance element; and an externally adjustable bias controller coupled to the bias element, wherein the externally adjustable bias controller comprises an adjustable reference generator coupled to the biasing element, a reference voltage terminal coupled to the reference generator for receiving an adjustable reference voltage from the reference generator, a resistor divider coupled between the reference voltage terminal and the negative terminal, and a voltage measurement terminal coupled between the resistor divider and the reference voltage for measuring the divided voltage.

20. A power supply damping circuit for providing a low value real impedance in parallel with a power supply, comprising:

first and second leads;

a transconductance element having a bias point and coupled between the first and second leads;

an AC-coupling member coupled between the first and second leads and the transconductance member;

an amplifier coupled between the AC-coupling member and the bias point of the transconductance element; and a digital controller coupled to the bias element for adjusting the bias of the bias element, wherein the digital controller comprises a shift register coupled to a digital to analog converter, and a digital to analog converter coupled to the bias element.

21. A power supply damping circuit for providing a low value real impedance in parallel with a power supply, comprising:

first and second leads;

a transconductance element having a bias point and coupled between the first and second leads;

an AC-coupling member coupled between the first and second leads and the transconductance member;

an amplifier coupled between the AC-coupling member and the bias point of the transconductance element; and an adaptive bias controller coupled to the bias element, wherein the adaptive bias controller comprises, an AC-coupling filter having an input coupled to the bias point of the transconductance element and an output;

a rectifier having an input coupled to the output of the AC-coupling filter and an output;

a low pass filter having an input coupled to the output of the rectifier and an input coupled to a reference generator; and an adjustable bias controller having an input coupled to the output of the low pass filter and an output coupled to the bias element, the output of the adjustable bias controller adjusting the bias element in response to the output of the low pass filter.

22. The power supply damping circuit of claim 21, wherein the adjustable bias controller comprises an externally adjustable reference generator coupled to the biasing element, a reference voltage terminal coupled to the reference generator for receiving an adjustable reference voltage from the reference generator, a resistor divider coupled between the reference voltage terminal and the negative terminal, and a voltage measurement terminal coupled between the resistor divider and the reference voltage for measuring the divided voltage.

23. A power supply damping circuit for providing a low value real impedance in parallel with a power supply, comprising:

first and second leads;

a transconductance element having a bias point and coupled between the first and second leads;

an AC-coupling member coupled between the first and second leads and the transconductance member;

an amplifier coupled between the AC-coupling member and the bias point of the transconductance element; and an adaptive bias controller coupled to the bias element, wherein the adaptive bias controller comprises, a comparator having an inverting input coupled to the bias point of the transconductance element, a non-inverting input coupled to a reference voltage, and an output;

a digital counter coupled to the output of the comparator; and a digital to analog converter coupled to the output of the digital counter and having an output coupled to the bias element.

* * * * *